United States Patent [19]

Yamakawa

[11] Patent Number: 4,942,542
[45] Date of Patent: Jul. 17, 1990

[54] IMAGE PROCESSING COMPUTER SYSTEM OPTIMIZED TO REDUCE IDLE TIME OF COMPUTER

[75] Inventor: Shinji Yamakawa, Kyoto, Japan

[73] Assignee: Dainippon Screen Mfg. Co., Ltd., Japan

[21] Appl. No.: 256,051

[22] Filed: Oct. 11, 1988

[51] Int. Cl.⁵ .................................. G06F 13/00
[52] U.S. Cl. ..................... 364/523; 364/521; 364/900; 340/723
[58] Field of Search ............ 364/518, 521, 522, 523, 364/900 MS File; 340/723, 750, 798, 799, 800; 346/160; 355/64

[56] References Cited

U.S. PATENT DOCUMENTS

| | | | |
|---|---|---|---|
| 4,408,301 | 10/1983 | Iida | 364/900 |
| 4,451,900 | 5/1984 | Mayer et al. | 364/900 |
| 4,481,603 | 11/1984 | McCaskill et al. | 364/900 |
| 4,484,302 | 11/1984 | Cason et al. | 364/900 |
| 4,633,432 | 12/1986 | Kitamura | 364/900 |

Primary Examiner—Gary V. Harkcom
Assistant Examiner—H. R. Herndon
Attorney, Agent, or Firm—Ostrolenk, Faber, Gerb & Soffen

[57] ABSTRACT

Image data is read by an image reading unit (21) and is supplied to a first storage unit (22) in which the received image data is written onto a removable storage medium (23), e.g., magnetic tape. The removable storage medium (23) is then removed from the first storage unit (22) and its contents are transferred to a second storage unit (26) which uses nonremovable storage medium, e.g., a hard disk. An image editing unit (24) is coupled to the second storage unit (26) and constantly fetches and edits the image data therein to create edited image data. Thus, image reading processing by means of the image reading unit (21) and image editing processing executed by means of the image editing unit (24) can proceed simultaneously. This reduces the overall idle time of each of the aforementioned storage/recording units.

3 Claims, 4 Drawing Sheets

IMAGE PROCESSING COMPUTER SYSTEM OPTIMIZED TO REDUCE IDLE TIME OF COMPUTER

BACKGROUND OF THE INVENTION

1. Field of the Invention

The present invention relates to an image processing computer system for producing an original film for the plate-making art, for example, for arranging a number of color images to be printed in a desired layout.

1. Description of the Prior Art

FIG. 1 is a block diagram of a conventional image processing computer system. Referring to FIG. 1, this system comprises a scanning type image reading unit 11 for photoelectrically scanning originals to read the image data of the originals, a magnetic disk unit 12 which is a storage medium which is fixedly and on-line connected to the image reading unit 11, a detachable, magnetic tape unit 13, an image editing unit 14 which is connected on-line to the magnetic disk unit 12 and to the magnetic tape unit 13 and has an interactive operating part 14a through which an operator edits and processes the image data in accordance with the desired layout, tone and the like of the originals, and a scanning type image recording unit 15, connected on-line to the magnetic disk unit 12, for scanning a photosensitive film by an exposure beam to record an image on the film in accordance with the image data edited by the image editing unit 14.

The image reading unit 11, which has a function corresponding to the image reading part of well known electronic color scanner, continuously reads the image data of a number of originals, at a high speed. The read image data is written into the magnetic disk unit 12 which is capable of high speed and continuous access and has a large storage capacity. Image data to be edited is fetched from the magnetic disk unit 12 and transferred to an internal memory of the image editing unit 14 and thereafter edited by an operator through the interactive operating part 14a. The edited image data thus obtained is again written into the magnetic disk unit 12. After all the image data is edited and again stored in the magnetic disk unit 12, the edited data is outputted to the image recording unit 15. The image recording unit 15, which has a function corresponding to the image recording part of a well known electronic color scanner, scans a photosensitive film by an exposure beam to expose the film in accordance with the edited image data. The magnetic tape unit 18 is used for a backup unit for storing the read image data and the edited image data.

In the aforementioned image processing through the image processing computer system shown in FIG. 1, the percentage of total operating usage of the respective units 11, 14 and 15 are approximately 40%, 50%, and 10%, respectively. In this image processing computer system, the magnetic disk unit 12 is shared by the image reading unit 11, the image editing unit 14 and the image recording unit 15, and only one unit at a time may gain access to the disk unit 12. Therefore, image editing processing by the image editing unit 14 can not be performed when the image data read by the image reading unit 11 is written in the magnetic disk unit 12 and when the edited image data is readout from the magnetic disk unit 12 to the image recording unit 18. Thus, the image editing unit 14 has an idle time of 50% (40% + 10%) of all the processing time.

Similarly, the image reading unit 11 has an idle time of 60% (50% + 10%) of all the processing time. Time-division multiple access of the magnetic disk unit 12 by the image reading unit 11 and the image editing unit 14 is impossible, because the image reading unit 11 continuously scans a number of originals to continuously output the image data of the originals to the magnetic disk unit 12.

Further, image reading processing by the image reading unit 11 must be performed in a plurality of times in the case, for example, where some of originals to be read, which are unavailable at the beginning of the processing, are read by the image reading unit 11 in the middle of the processing. In such a case, image editing processing by the image editing unit 14 must be interrupted.

In general, an image processing computer system is extremely expensive, and hence it is desirable to decrease its idle time as much as possible, in order to increase productivity and decrease processing costs.

Although another type of an image processing computer system having a plurality of magnetic disk units 12a and 12b is proposed, as shown in FIG. 2, to perform image reading processing, image editing processing and image recording processing in parallel, such a system requires an additional expensive magnetic disk unit of high speed and large storage capacity, resulting in a high system cost.

SUMMARY OF THE INVENTION

An image processing computer system according to the present invention comprises an image reading unit for scanning an original to read image data of the original, a first storage medium detachable type storage unit on-line connected to the image reading unit, for writing the image data read by the image reading unit on a detachable storage medium a second storage medium detachable type storage unit, to which the detachable storage medium is loaded a storage medium fixed type storage unit, to which the image data, written on the detachable storage medium, is transferred from the second storage medium detachable type storage unit, and an image editing unit, on-line connected to the second storage medium detachable type storage unit and the storage medium fixed type storage unit, for fetching and editing the image data transferred to the storage medium fixed type storage unit.

In a preferred embodiment, the image processing computer system according to the present invention further comprises an image recording unit for scanning a photosensitive material to record an image on the photosensitive material in accordance with the image data edited by the image editing unit.

According to the present invention, image data read by the image reading unit is outputted to the first storage medium detachable type storage unit, while image data to be edited is fetched from the storage medium fixed type storage unit to the image editing unit. Therefore, image reading processing by the image reading unit and image editing processing by the image editing unit can be concurrently performed.

Accordingly, it is an object of the present invention to provide an image processing computer system which can decrease the idle time, to increase productivity and decrease processing costs, without adding an expensive storage medium fixed type storage unit of high speed and large capacity, such as a magnetic disk unit.

These and other objects, features, aspects and advantages of the present invention will become more apparent from the following detailed description of the present invention when taken in conjunction with the accompanying drawings.

DETAILED DESCRIPTION OF THE EMBODIMENTS

Figure 1:
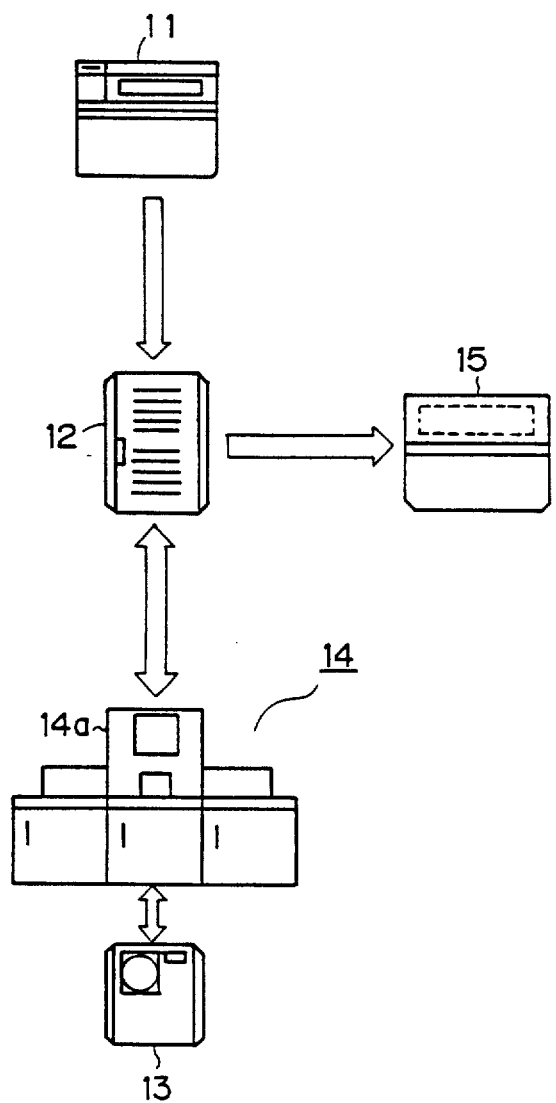
FIG. 1 and FIG. 2 are block diagrams showing conventional image processing computer systems.
Figure 2:
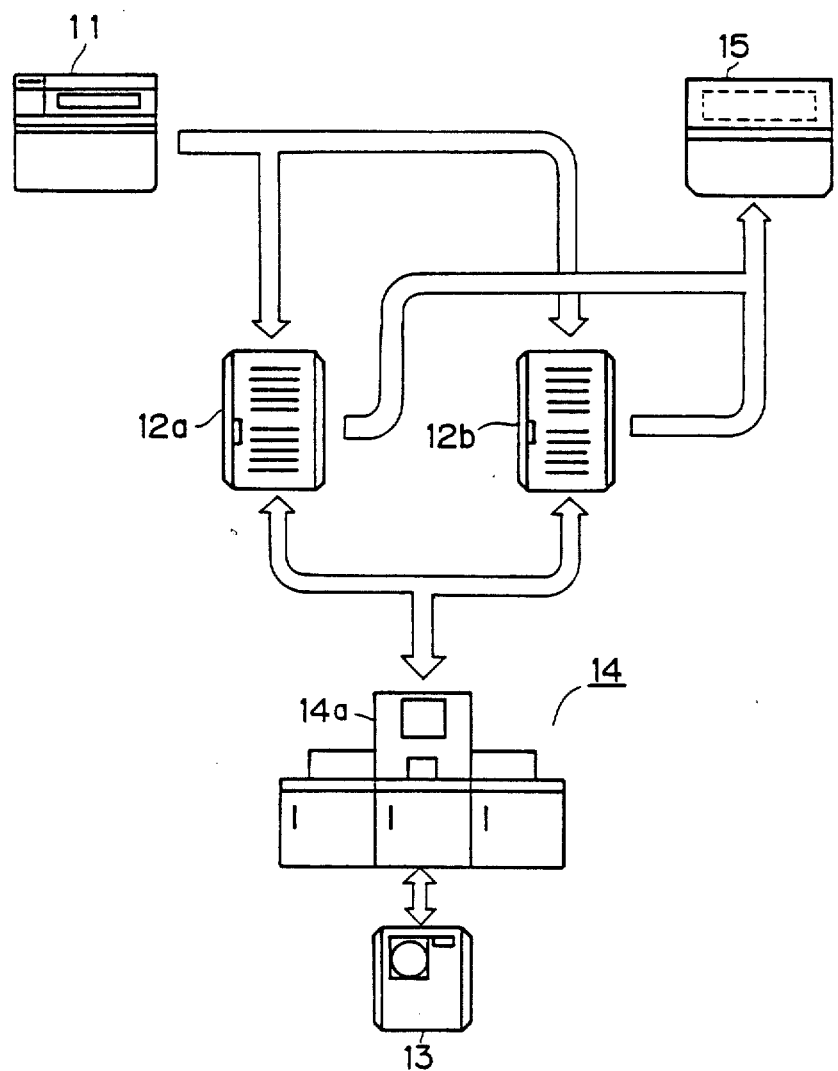
Figure 3:
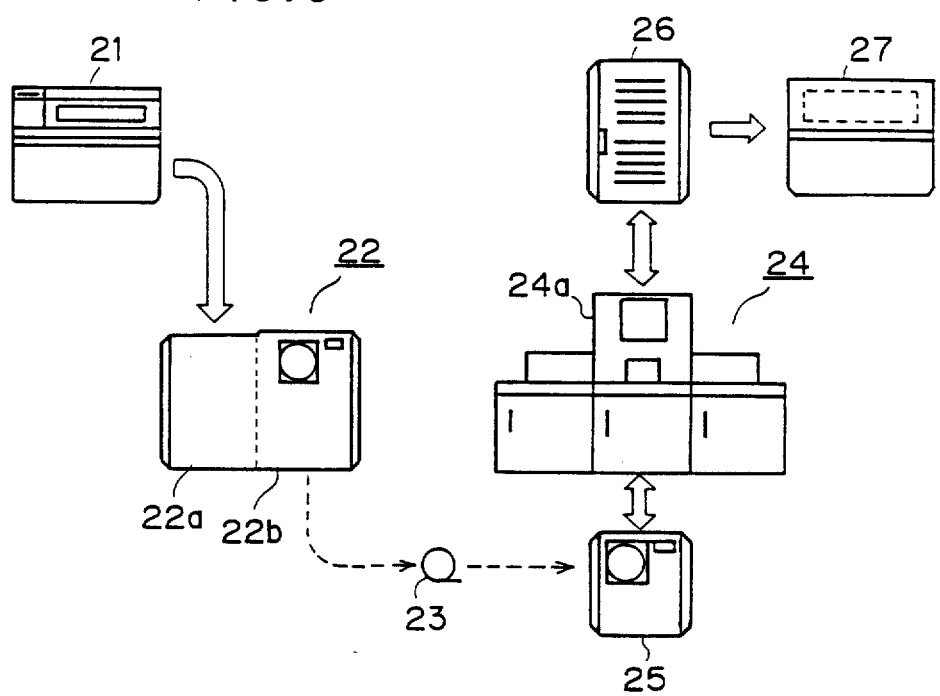
FIG. 3 is a block diagram showing a first embodiment of an image processing computer system in accordance with the present invention.

FIG. 8 is a block diagram showing a first preferred embodiment of an image processing computer system in accordance with the present invention. Referring to FIG. 3, this image processing computer system includes a scanning type image reading unit 21 which has a function corresponding to the original image reading part of a conventional electronic color scanner. As is well known, the image reading unit 21 photoelectrically scans originals to read and outputs the image da&a of the originals. The image reading unit 21 is connected on-line to a storage medium detachable type image data storage unit. The storage unit 22 comprises a magnetic tape read/write controller 22a and a magnetic tape unit 22b. The image data read by the image reading unit 21 is continuously written on a magnetic tape 23 provided on magnetic tape unit 22b under the control of the magnetic tape read/write controller 22a.

Figure 4:
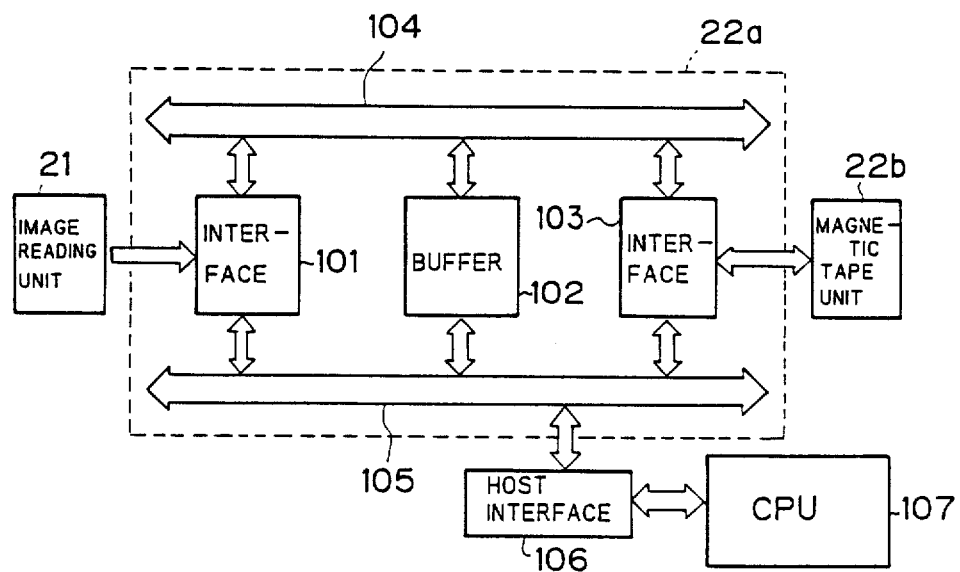
FIG. 4 is a block diagram showing a magnetic tape read/write controller.

As shown in FIG. 4, the magnetic tape read/write controller 22a comprises an interface 101 for the image reading unit 21, a buffer 102 for processing a bad track in the magnetic tape 23 and an interface 103 for the magnetic tape unit 22b, which are connected through an image data bus 104 and a command bus 105. The buffer 102 is prepared by a FIFO (first in first out) type memory of large capacity. which temporarily stores image data inputted from the image reading unit 21 when a bad track of the magnetic tape 23 is detected. The command bus 105 is connected to the central processing unit 107 of a host computer though a host interface 106. The image data bus 104 is connected in a time-division manner with the interfaces and 103 and the buffer 102, to perform multiplexed transfer of image data.

The image processing computer system shown in FIG. 3 further includes an image editing unit 24, connected on-line to a magnetic tape unit 25 (a storage medium of the detachable type) and a magnetic disk unit 26 which is a fixed type storage medium. The image editing unit 24 includes an interactive operating part 24a, a CRT display, a keyboard and the like, through which an operator performs editing processing of image data In accordance with the desired layout, trimming, tone and the like of originals. The magnetic disk unit 26 is connected on-line to a scanning type image recording unit 27. The image recording unit 27 has a function corresponding to the image recording part of the conventional electronic color scanner. That is, the image recording unit 27 scans a photosensitive film by means of an exposure beam to expose the film, to thereby record an image on the film in accordance with the edited image data produced from the image editing unit 24.

In operation a set of originals are read by the image reading unit 21, and at the same time the read image data is written in sequence on the magnetic tape 23 by the image data storage unit 22. The magnetic tape 23 is then unloaded from the magnetic tape unit 22b of the image data storage unit 22 and loaded on the magnetic tape unit 28, to allow transferring of the image data stored in the magnetic tape 23 to the magnetic disk unit 26. Thereafter a new magnetic tape 23 is loaded on the magnetic tape unit 22b to enable another set of originals to be read by the image reading unit 21.

In parallel with the data transfer operation from the magnetic tape unit 25 to the magnetic disk unit 26, image editing processing by the image editing unit 24 is performed. That is, an operator causes desired image data to be transferred from the magnetic disk unit 26 to the internal memory (not shown) of the image editing unit 24, to edit the same through the interactive operating part 24a. The magnetic disk unit 26 is in a wait state, i.e., in a mode whereby it is not accessed by the image editing unit 24, while the image editing processing is performed through the image editing unit 24 after the fetching of the image data to be edited. Unedited image data stored in the magnetic tape 23 is intermittently transferred from the magnetic tape unit 24 to the magnetic disk unit 26 during the wait state. Thus, image reading processing by the image reading unit 21 and image editing processing by the image editing unit 24 can be concurrently performed. As a result, idle time is decreased, to bring about increased productivity and reduced processing costs.

Image data edited by the image editing unit 24 is accumulated in sequence in the magnetic disk unit 26. After all the image data is edited and accumulated in the magnetic disk unit 26, the edited image data is outputted to the image recording unit 27 which in turn records an image on a photosensitive film in accordance with the edited image data.

Figure 5:
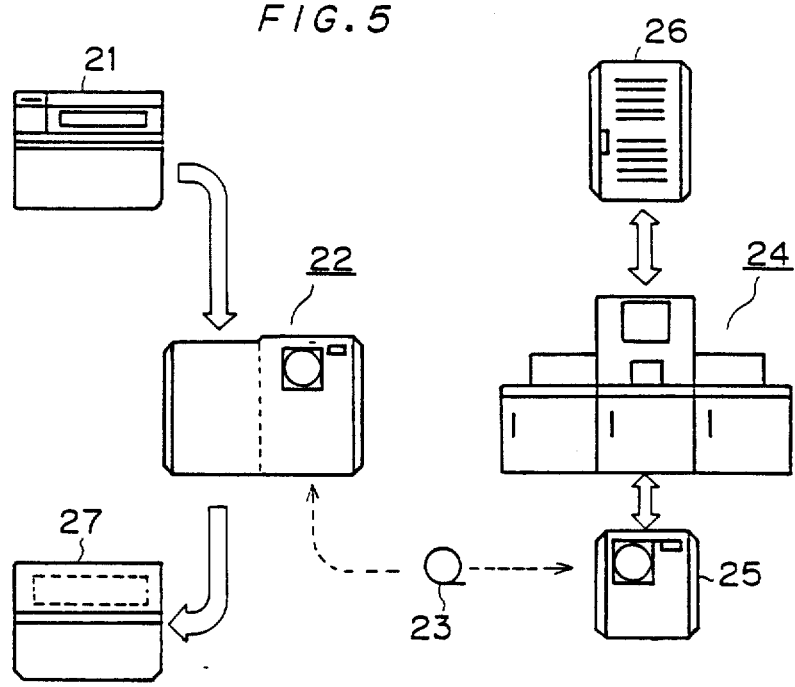
FIG. 5 and FIG. 6 are block diagrams showing second and third embodiments of the image processing computer system in accordance with the present invention.

FIG. 5 is a block diagram of a second preferred embodiment of an image processing computer system of the present invention. The second embodiment differs from the first embodiment in that the image recording unit 27 is not connected on-line to a magnetic disk unit 26 but is rather connected on-line to a storage medium of the detachable type, namely image data storage unit 22.

In the second embodiment, edited image data accumulated in the magnetic disk unit 26 is rapidly transferred to a magnetic tape unit 24 to be written into a magnetic tape 23, after image editing processing by the image editing unit 24. This magnetic tape 23 is unloaded from the magnetic tape unit 25 and is loaded onto the image data storage unit 22, and then the edited image data written in the magnetic tape 23 is outputted to the image recording unit 27 through the image data storage unit 22. According to the second embodiment, image editing processing by the image editing unit 24 can be performed in parallel with image reading processing by an image reading unit 21 or image recording processing by the image recording unit 27.

Figure 6:
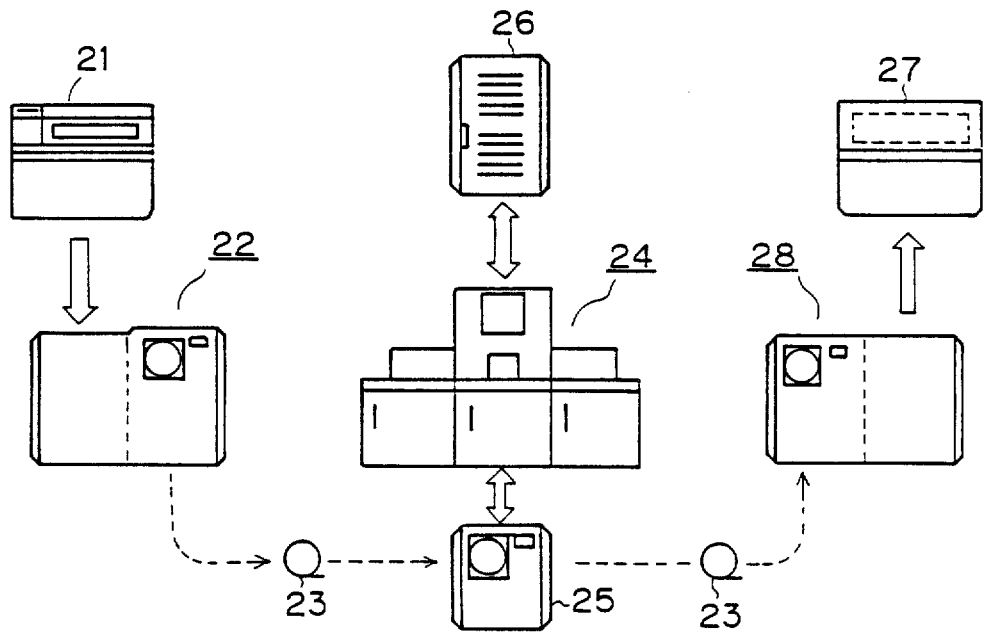

FIG. 6 is a block diagram of a third preferred embodiment of an image processing computer system of the present invention. This third embodiment differs from the first embodiment in that the image recording unit 27 is not connected on-line to the magnetic disk unit 26 but is connected on-line to an additional storage medium of the detachable type, namely image data storage unit 28 which is similar to a storage medium of the detachable type, namely image data storage unit 22.

In the third embodiment, edited image data accumulated in the magnetic disk unit 26 is rapidly transferred to a magnetic tape unit 25 to be written in a magnetic tape 23, after image editing processing by the image editing unit 24. This magnetic tape 23 is then unloaded from the magnetic tape unit 25 and loaded on the additional image data storage unit 28. Then, the edited image data written in the magnetic tape 23 is outputted to accordance with the present invention. This second the image recording unit 27 through the additional image data storage unit 28. According to the third embodiment, image editing processing by the image editing unit 24 can be performed in parallel with image reading processing by the image reading unit 21 and image recording processing by the image recording unit 27.

The magnetic disk unit 26 may be replaced by another type of storage medium of the fixed type such as a read/write optical disk unit a read/write IC memory. Further, the image data storage units 22 and 28 and the magnetic tape unit 25 may be replaced by another type of storage medium of the detachable type, such as a magnetic disk unit having a magnetic disk (including a floppy disk) at a detachable storage medium, a read/write optical disk unit having a read/write optical disk as a detachable storage medium or a card type IC storage unit having a card type memory IC as a detachable storage medium.

Although the single magnetic disk unit 26 is used in the aforementioned embodiments, the present invention is not restricted to the use of a single magnetic disk unit and a plurality of magnetic disk units may be used.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing computer system, comprising:
    an image reading unit for scanning an original to read image data of the original;
    a first storage unit of the type which stores data on removable storage medium, connected on-line to said image reading unit, for writing said image data read by said image reading unit onto said removable storage medium;
    a second storage unit of the type which stores data on removable storage medium, for loading thereon removable storage medium on which image data has been written by said first storage unit;
    a third storage unit having a fixed storage medium for transferring thereto said image data from said second storage unit;
    an image editing unit, connected on-line to said second storage unit and said third storage unit, for fetching and editing said image data transferred to said third storage unit and for generating edited image data; and
    an image recording unit for scanning a photosensitive material to record an image on the photosensitive material in accordance with said edited image data generated by said image editing unit;
    said image recording unit being connected on-line to said third storage unit, to receive said edited image data through said third storage unit.

2. An image processing computer system, comprising:
    an image reading unit for scanning an original to read image data of the original;
    a first storage unit of the type which stores data on removable storage medium, connected on-line to said image reading unit, for writing said image data read by said image reading unit onto said removable storage medium;
    a second storage unit of the type which stores data on removable storage medium, for loading thereon removable storage medium on which image data has been written by said first storage unit;
    a third storage unit having a fixed storage medium for transferring thereto said image data from said second storage unit;
    an image editing unit, connected on-line to said second storage unit and said third storage unit, for fetching and editing said image data transferred to said third storage unit and for generating edited image data; and
    an image recording unit for scanning a photosensitive material to record an image on the photosensitive material in accordance with said edited image data generated by said image editing unit;
    said image recording unit being connected on-line to said first storage unit, said second storage unit being effective to write said edited image data on a detachable storage medium which is in turn loaded onto said first storage unit, said image recording unit receiving said edited image data through said first storage unit.

3. An image processing computer system, comprising:
    an image reading unit for scanning an original to read image data of the original;
    a first storage unit of the type which stores data on removable storage medium, connected on-line to said image reading unit, for writing said image data read by said image reading unit onto said removable storage medium;
    a second storage unit of the type which stores data on removable storage medium, for leading thereon removable storage medium on which image data has been written by said first storage unit;
    a third storage unit having a fixed storage medium for transferring thereto said image data from said second storage unit;
    an image editing unit, connected on-line to said second storage unit and said third storage unit, for fetching and editing said image data transferred to said third storage unit and for generating edited image data;
    an image recording unit for scanning a photosensitive material to record an image on the photosensitive material in accordance with said edited image data generated by said image editing unit; and
    a fourth storage medium of the type which stores data on removable storage medium, wherein
    said image recording unit is connected on-line to said fourth storage unit, said second storage unit being effective to write said edited image data on removable storage medium which is in turn loaded onto said fourth storage unit, said image recording unit receiving said edited image data through said fourth storage unit.

* * * * *